July 10, 1962 W. B. McCARDELL 3,043,169
APPARATUS FOR PRESSURE FORMING TOOTHED ELEMENTS
Filed May 14, 1959 3 Sheets-Sheet 1

INVENTOR.
Willard B. McCardell
BY
Harness, Dickey & Pierce
ATTORNEYS

July 10, 1962 W. B. McCARDELL 3,043,169
APPARATUS FOR PRESSURE FORMING TOOTHED ELEMENTS
Filed May 14, 1959 3 Sheets-Sheet 2

INVENTOR.
Willard B. McCardell
BY
Harness, Dickey & Pierce,
ATTORNEYS.

July 10, 1962 W. B. McCARDELL 3,043,169
APPARATUS FOR PRESSURE FORMING TOOTHED ELEMENTS
Filed May 14, 1959 3 Sheets-Sheet 3

INVENTOR.
Willard B. McCardell
BY
Harness, Dickey & Pierce.
ATTORNEYS.

United States Patent Office 3,043,169
Patented July 10, 1962

3,043,169
APPARATUS FOR PRESSURE FORMING TOOTHED ELEMENTS
Willard B. McCardell, Royal Oak, Mich., assignor to Michigan Tool Company, Detroit, Mich., a corporation of Delaware
Filed May 14, 1959, Ser. No. 813,234
5 Claims. (Cl. 80—16)

This invention relates to apparatus for pressure forming teeth on toothed elements such as spline shafts, worms, gears, and the like, and more particularly, to improved tools for pressure forming external teeth on such toothed elements.

An object of the invention is to overcome disadvantages in prior tools of the indicated character and to provide improved tooling for pressure forming teeth on toothed elements which will reduce the cost of manufacturing the toothed elements, increase the speed of production, and improve the quality thereof.

Another object of the invention is to provide improved apparatus for pressure forming toothed elements which is simple in construction, durable, efficient and reliable in operation, and which may be manufactured with a minimum of labor and expense.

The above as well as other objects and advantages of the present invention will become apparent from the following description, the appended claims, and the accompanying drawings, wherein:

FIGURE 6 is a top plan view of the apparatus illustrated in FIGURE 5;

FIGURE 9 is an end view of another embodiment of the invention showing the same applied to a workpiece.

Figure 1:
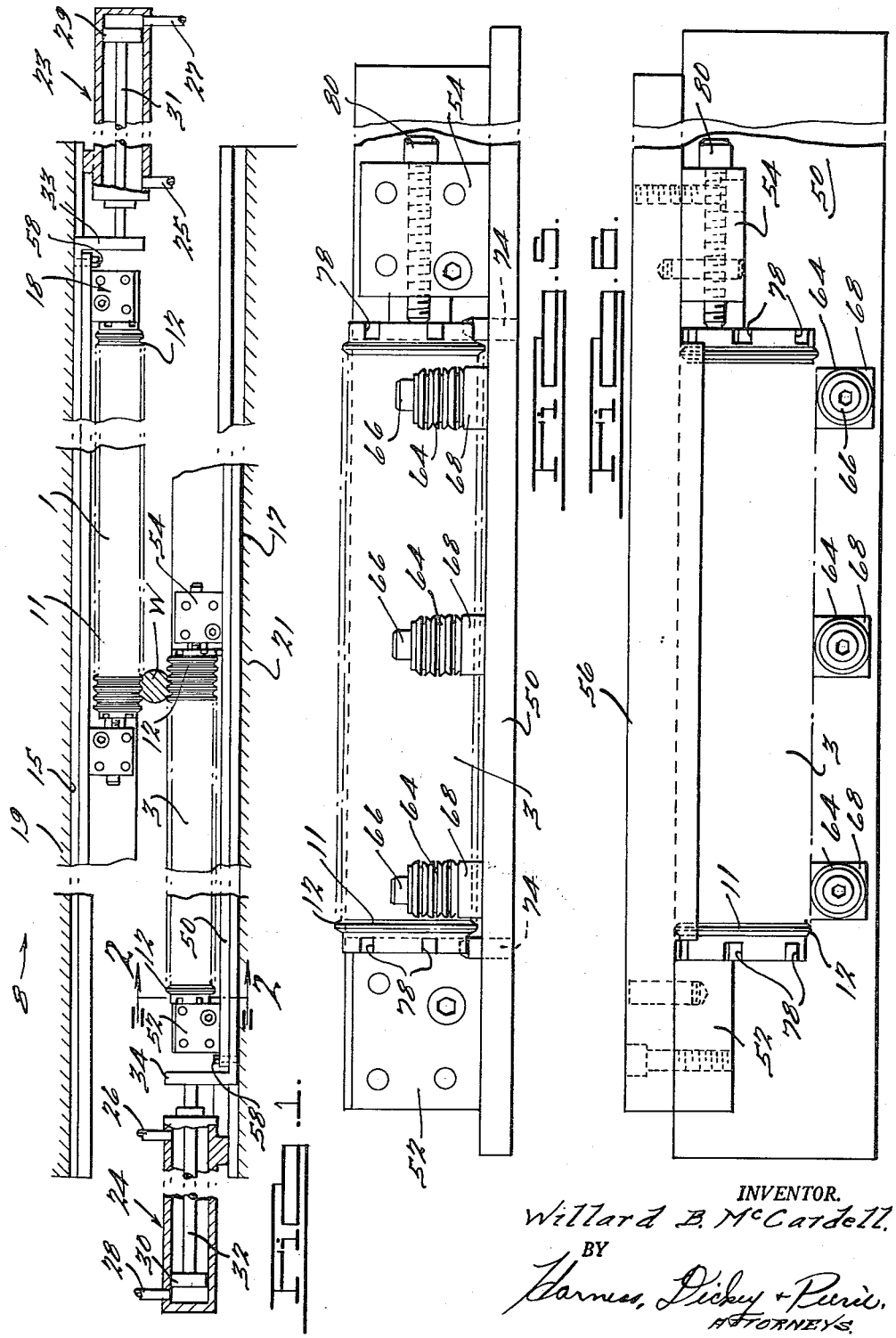
FIGURE 1 is a schematic and simplified illustration, in side elevation and with parts removed, of apparatus embodying the present invention.
Figure 2:
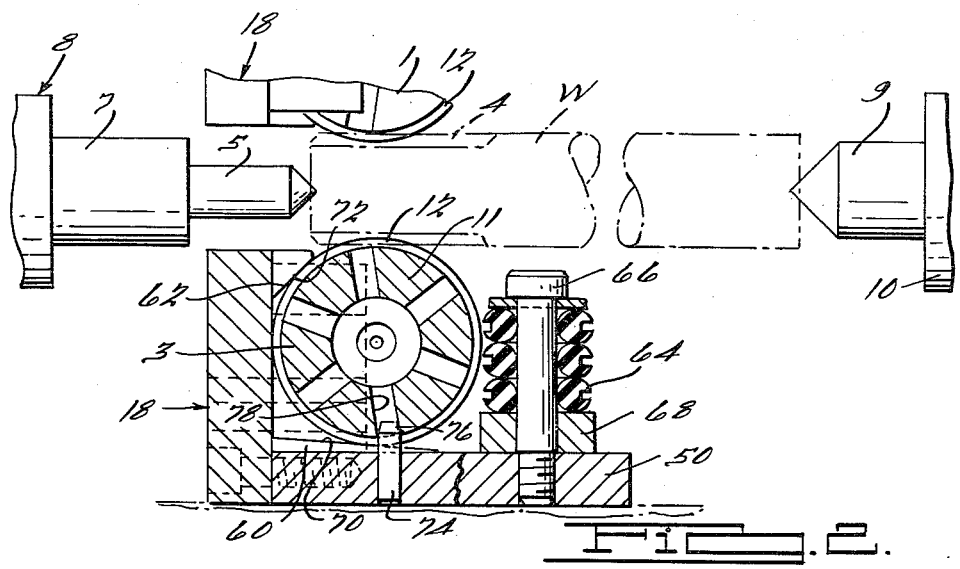
FIGURE 2 is a sectional view of the structure illustrated in FIGURE 1, taken on the line 2—2 thereof.

Referring to the drawings, preferred embodiments of the invention are illustrated. In FIGURES 1 and 2 a workpiece W is shown in position between the upper and lower tools 1 and 3 embodying the present invention, the tools 1 and 3 being shown at the beginning of the operation which will pressure form involute teeth 4 on the periphery of the workpiece W. The workpiece W is supported by means which permit it to rotate freely on a fixed axis when urged to do so by the tools 1 and 3. At the same time, the workpiece is fed axially between the tools for any desired distance to form teeth 4 of the desired length on the workpiece. Thus, reciprocation of the cylindrical tools 1 and 3 is combined with an axial feed of the workpiece W so as to roll involute teeth of any reasonable length on the workpiece. The tools 1 and 3 are reciprocated relative to the workpiece W in a relatively short but fast travel, and as the reciprocating tools follow a straight path, the workpiece W is axially fed until the desired tooth length is obtained. By way of example, with tools approximately nine inches long, the axial feed rate of the workpiece may be in the order of from $\frac{1}{16}$ to $\frac{1}{8}$ inch per tool stroke depending on the workpiece diameter, pitch, and desired finish. To illustrate such means, there is known in FIGURE 2 a center pin 5 which is carried by an axially movable member 7 which may be mounted for reciprocation in the apparatus or machine 8 which carries the tools 1 and 3. The workpiece supporting means is also shown as including a center pin 9 carried by the piston rod 10 of a conventional piston and cylinder until that is also supported by the apparatus on which the tools 1 and 3 are mounted. Means may be provided for adjusting the piston and cylinder unit so as to provide adjustments whereby varying lengths of workpieces W may be handled by the machine.

The upper and lower tools 1 and 3 are identical and include a body portion 11 having teeth 12 extending circumferentially around the periphery thereof that engage the surface of the workpiece W. The tools 1 and 3 are movable axially by suitable means and are illustrated herein as being slidable on ways 15 and 17, the tools 1 and 3 being carried by tool holders, generally designated 18, which will be described hereinafter in greater detail. The ways 15 and 17 are shown as being formed in the head 19 and bed 21, respectively, of the machine 8 which carries the tools.

Figure 3:
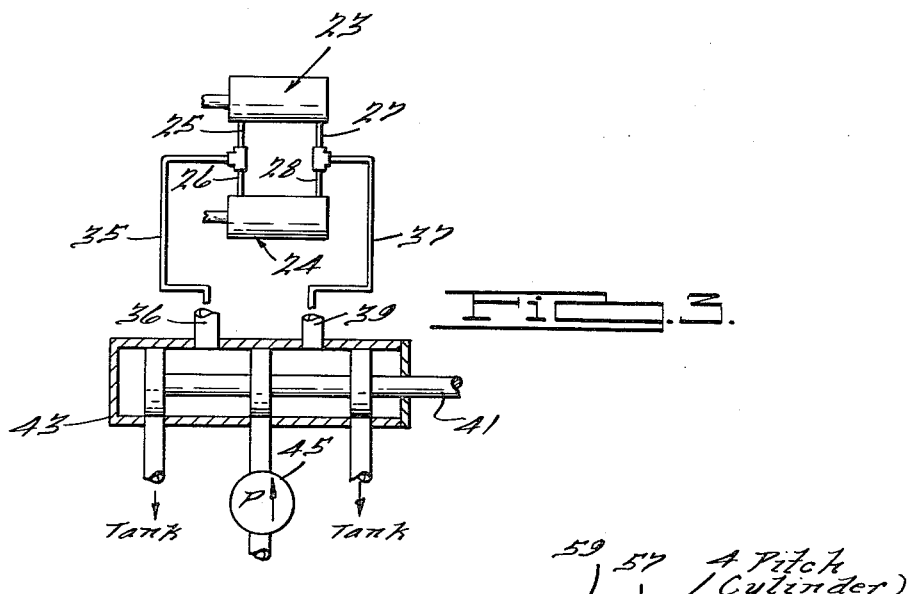
FIGURE 3 is a simplified and schematic circuit diagram of the mechanism for driving the apparatus illustrated in FIGURE 1, with the control valve enlarged and the direction of one of the tool moving pressure cylinders reversed for purposes of illustration.

Means are provided for simultaneously moving the tools 1 and 3 in opposite directions. This means is illustrated in FIGURES 1 and 3 as comprising a pair of identical pressure cylinders 23 and 24 having pressure ports 25 and 26 at one end and pressure ports 27 and 28 at the opposite end. Pistons 29 and 30 are mounted for reciprocation in the cylinders, the pistons having rods 31 and 32. The rod 31 is fixed to the trailing end of a tool slide 33 mounted on the ways 15 while the rod 32 is fixed to the trailing end of a tool slide 34 mounted on the ways 17. Suitable valving is provided which may be used to control the fluid pressure in the cylinders 23 and 24 so as to actuate and synchronize the movement of the pistons whereby the tools 1 and 3 move at the same instant and at the same velocities in opposite directions. By way of illustration, in FIGURE 3 the cylinder ports 25 and 26 are shown as being joined together by a T connector and are connected by the line 35 to the port 36 while the cylinder ports 27 and 28 are joined together by a T connector and connected by the line 37 to the port 39. A three land spool valve 41 is provided in a valve casing 43, the spool valve 41 being shiftable to the right so as to connect the ports 25 and 26 to pressure from a pump 45 and to connect ports 27 and 28 to tank. By shifting the spool valve 41 to the left, the reverse condition is obtained whereby ports 25 and 26 are connected to tank and the ports 27 and 28 are connected to pressure.

In the operation of the apparatus as above described, with the tool 1 and 3 in the positions shown in FIGURES 1 and 2, the workpiece W is mounted on the centers 5 and 9 which permit the workpiece to be rotated by the tools 1 and 3. The valve 41 is moved to the left so as to connect the ports 27 and 28 to pressure and to connect the ports 25 and 26 to tank so that the tool 1 moves to the left and the tool 3 moves to the right, as viewed in FIGURE 1. The spacing between the tools 1 and 3, measured in a vertical plane which includes the longitudinal axes of both of the tools 1 and 3 is such that the distance between the tips of the teeth of the tools 1 and 3 is less than the original diameter of the workpiece W. Thus, the shape or configuration of the teeth 12 of each tool 1 and 3 is impressed or conjugated on the periphery of the workpiece W. At the same time that the tools 1 and 3 are reciprocated past the workpiece, the workpiece is preferably continually axially fed so as to increase the length of the teeth 4 being formed on the workpiece. The tools 1 and 3 are reciprocated back and forth past the workpiece while the workpiece is continually fed axially until the desired spline or gear tooth length is obtained, the teeth on the tools generating the teeth formed on the workpiece. After the desired length of the teeth on the workpiece is obtained, the workpiece is removed from between the tools by withdrawing the workpiece to the right, as viewed in FIGURE 2, after which a new workpiece can then be inserted in the apparatus and the operation repeated.

In rolling involute teeth of the desired shape, as for example spline teeth having a 30° or a 45° pressure angle, into the workpiece, the workpiece material will flow adjacent the surface in radial and tangential directions so as to form grooves of less than the original diameter of the workpiece and teeth of greater diameter than the original diameter of the workpiece. This flow of material is taken into account in selecting the diameter of that portion of the workpiece which is to be subjected to the action of the tools 1 and 3.

Figure 4:
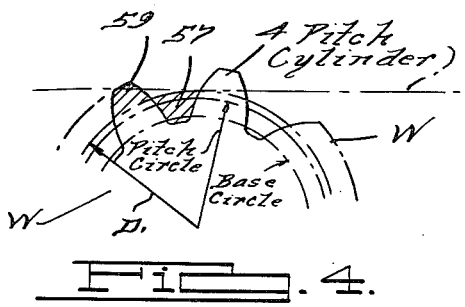
FIGURE 4 is a fragmentary view of a typical involute spline that can be formed by the tool of the present invention.

Referring to FIGURE 4, a common involute tooth shape is illustrated which may be rolled by means of the tools embodying the present invention. In FIGURE 4 a portion of a cross section of a workpiece W is finished form is illustrated, the workpiece having involute teeth or splines 4. Since no metal is removed in the rolling operation, the diameter of the workpiece W prior to rolling cannot be either the final outside diameter or the root diameter. The rolling diameter $D_1$ of the workpiece W is selected so that the area 57 of displaced tooth material inside the $D_1$ periphery is equal to the area 59 of tooth material on a greater diameter than $D_1$. The diameter $D_1$, or substantially this diameter, is taken as the tool pitch diameter P.D. and defines the pitch cylinder P.C. for the cylindrical tools 1 and 3, the pitch cylinder being tangent to the rolling diameter $D_1$ of the workpiece. The pressure angle of the teeth 12 of the tools at the diameter $D_1$ and the pressure angle or angle of obliquity of the teeth 4 of the workpiece at the diameter $D_1$ is the angle whose cosine is $D/D_1$ multiplied by the cosine of the pressure angle at the pitch diameter of the teeth 4 where D is the pitch diameter of the workpiece W. The base pitch of the tools and of the workpiece are identical. With such a consruction, the circular pitch of the teeth 12 on the tool, as measured axially on the pitch cylinder thereof, parallel to the longitudinal axis of the tool corresponds with the circular pitch of the teeth 4 on the workpiece, as measured on a circle having the diameter $D_1$ of the workpiece. The whole depth of all of the teeth 12 on each tool 1 and 3 which engage the workpiece W is the same as that of the workpiece, i.e., all of the tool teeth 12 are fully conjugate to the teeth 4 on the workpiece.

Since, in transverse cross section, the teeth 12 on the tools are circular, the depth of the impression made in the workpiece gradually increases as the workpiece is fed axially between the tools 1 and 3. Thus, the teeth 12 on the tools gradually penetrate the workpiece as the workpiece is axially fed between the tools while the tools are reciprocating, the maximum penetration being effected in a plane which is perpendicular to the longitudinal axis of the workpiece and which includes the longitudinal axes of both of the tools. As the workpiece continues to move past the center line of action between the tools, the pressure exerted on the workpiece by the tools is gradually decreased as the fully formed portion of the workpiece moves free of the tools.

Figure 7:
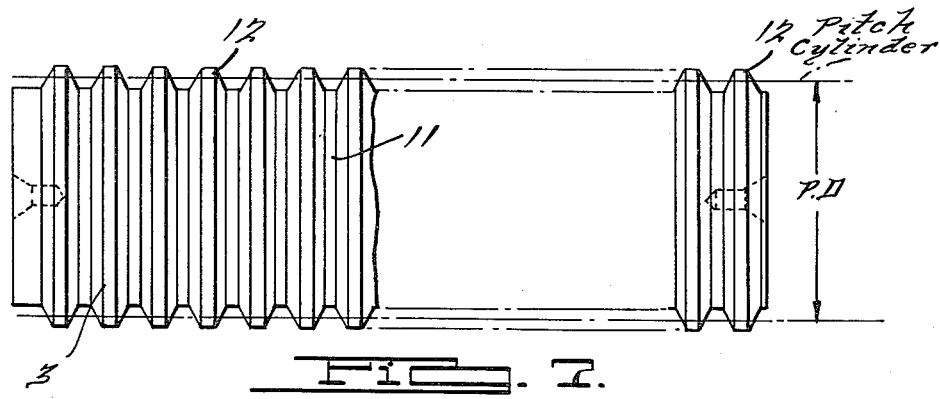
FIGURE 7 is an enlarged view of one of the tools illustrated in FIGURE 1.
Figure 8:
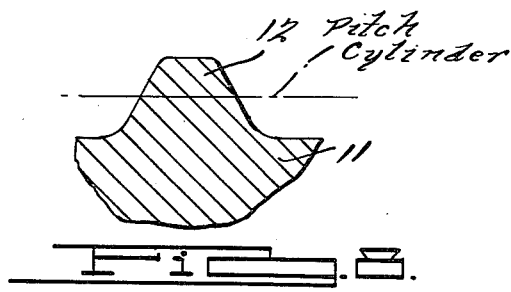
FIGURE 8 is an enlarged sectional view in a radial plane of one of the teeth of the tool illustrated in FIGURE 7.

As shown in FIGURE 7, in this embodiment of the invention, all of the teeth 12 on the tools are perpendicular to the longitudinal axes of the tools. Thus, the pitch cylinder of the tool teeth 12 defines an infinite number of pitch lines parallel to the longitudinal axis of each tool, and in any radial plane which includes the axis of the tool, all of the teeth 12 on the tool are full sized and fully conjugate to the teeth on the workpiece.

Figure 5:
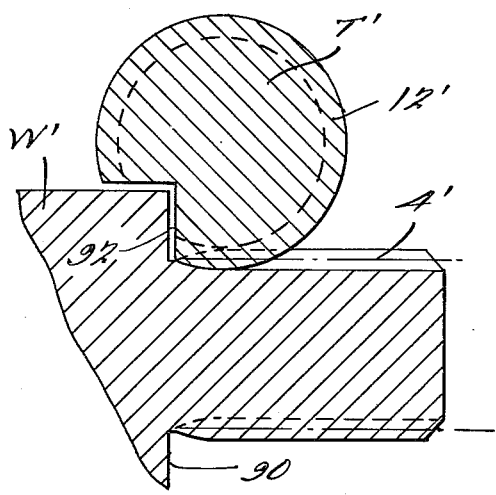
FIGURE 5 is an enlarged side-elevational view of the tool and tool holder illustrated in FIGURE 1.

The tools 1 and 3 are preferably precision made of high alloy steel and may be readily ground to the desired configuration. As wear occurs, the tools 1 and 3 may be indexed in the holders 18 to bring an unworn portion of the forming teeth 12 into use. Indexing thus permits several settings for each tool before the tools become worn and unserviceable. As shown in FIGURES 2, 5 and 6, each tool holder 18 is comprised of a base 50 to which are fixed end members 52 and 54 and a back member 56, the base being secured to the associated slide member 33 or 34 by bolts 58. As shown in FIGURE 2, the base 50 is provided with a tapered ramp portion 60 upon which the periphery of the tool rests while the back member 56 carries a generally wedge-shaped retainer 62 which also engages the periphery of the tool and serves to prevent vertical movement of the tool. In order to permit workpieces to be withdrawn from between the tools 1 and 3 after the tooth-forming operation, a plurality of spaced, resilient bumper members 64 are provided which are carried by posts 66 secured to the base 50, suitable spacers 68 being provided to insure that the bumpers are carried at the desired height. With the above described construction, when axial feeding movement is imparted to the workpiece W, the tools 1 and 3 are forced transversely of each base 50 so that the tools 1 and 3 are wedged between the tapered surface 70 of the ramp 60 and the wedge or tapering surface 72 of the retainers 62 to hold the tools securely in the proper position. In order to provide for indexing movement of the tools 1 and 3 after they become worn, suitable pins 74 are fixed to the base 50, the free ends of the pins 74 being tapered as at 76 so as to fit in angularly spaced, radial slots 78 provided in the end portions of the tools 1 and 3. With such a construction the tools are permitted to rock about the tapered ends 76 of the pins 74 thereby permitting the tools 1 and 3 to spread apart a sufficient distance to permit the workpiece to be withdrawn from between the tools after the tooth-forming operation by compressing the resilient bumpers 64, the bumpers serving to rock the tool back against the tapered surfaces 70 and 72 to the correct tooth-forming position after the workpiece has been withdrawn.

It will be noted that in setting up the tools embodying the present invention, that the teeth 12 of the tools will be in a direct vertical line with one another when forming an even number of teeth but ½ pitch apart when forming an odd number of teeth. In order to permit correct adjustment of the tools, an adjustable abutment stop 80 is provided in the end member 54 of each tool holder, the adjustable abutment stop 80 being in the form of a threaded member which may be adjusted axially of the associated tool, suitable shim means being provided at the opposite end of the tool so that each tool may be properly set up and aligned with its mating tool.

As shown in FIGURE 9, when it is desired to form teeth on a workpiece W' having a shoulder 90, each tool T' can be longitudinally notched as at 92 so that full-depth teeth 4' can be formed in the workpiece W' up to a point closely adjacent the shoulder 90. It will be appreciated that in this form of the invention, the workpiece W' is fed axially from the left toward the right as viewed in FIGURE 9.

While preferred embodiments of the invention have been shown and described, it will be understood that various changes and modifications may be made without departing from the spirit of the invention.

What is claimed is:

1. In combination with a cylindrical tool having teeth extending around the periphery thereof, a holder for said tool, said holder comprising a base having an upwardly tapering surface adjacent one edge thereof, means carried by said base providing a wedge-shaped retainer disposed in spaced opposed relationship with respect to said tapered surface whereby said tool may be wedged therebetween, and resilient means carried by said base and adapted to bias said tool toward said retainer and said tapered surface.

2. In combination with a cylindrical tool having teeth extending around the periphery thereof, a holder for said tool, said holder comprising a base having an upwardly tapering surface adjacent one edge thereof, means carried by said base providing a wedge-shaped retainer disposed in spaced opposed relationship with respect to said tapered surface whereby said tool may be wedged therebetween, resilient means carried by said base and adapted to bias said tool toward said retainer and said tapered surface, and means carried by said base and cooperating with said tool whereby said tool may be indexed through a predetermined angular increment.

3. In combination with a tool for pressure forming teeth on the periphery of a cylindrical workpiece, said tool having a body portion substantially cylindrical in cross section and being provided with teeth thereon the flanks of which extend transversely of the axis of revolution of said body portion, each of said teeth in a radial plane including the axis of revolution of said body portion being conjugate to the teeth to be formed on the workpiece, each of said teeth having a pitch cylinder corresponding with the diameter of a circle which encompasses a cross-sectional area of the interdental space between the teeth of the workpiece equal to the cross-sectional area of the portions of the teeth of the workpiece outside the circle, means for supporting a said workpeice for rotation about the longitudinal axis thereof, means for feeding the workpiece in a direction substantially parallel to the longitudinal axis thereof, and means for reciprocating said tool in a direction transverse to the longitudinal axis of the workpiece.

4. In combination with a pair of tools for pressure forming teeth on the periphery of a cylindrical workpiece, each of said tools being provided with a substantially cylindrical body portion having teeth thereon the flanks of which extend circumferentially of said tools, each of said teeth in transverse cross section being conjugate to the teeth to be formed on the workpiece and having a pitch cylinder concentric with the longitudinal axis of the body portion of the tool, the cross-sectional configuration of each of said teeth being substantially constant throughout the length thereof, the circular pitch of said teeth measured on said pitch cylinder corresponding with the circular pitch of the teeth on the workpiece measured on a circle having a diameter $D_1$, where $D_1$ is the diameter of a circle which encompasses a cross-sectional area of the interdental space between the teeth of the workpiece equal to the cross-sectional area of the portions of the teeth of the workpiece outside the circle, the pressure angle of each of said teeth measured at said pitch cylinder being the angle whose cosine is $D/D_1$ multiplied by the cosine of the pressure angle at the pitch diameter D of the teeth of the workpiece, means for supporting a said workpiece for rotation about the longitudinal axis thereof, means for feeding the workpiece in a direction substantially parallel to the longitudinal axis thereof, and means for simultaneously reciprocating said tools in opposite directions transverse to the longitudinal axis of the workpiece.

5. The combination as set forth in claim 1 wherein the body portion of each of said tools defines a longitudinal notch extending for substantially the entire length thereof.

References Cited in the file of this patent
UNITED STATES PATENTS

| | | |
|---|---|---|
| 2,715,846 | Grob et al. | Aug. 23, 1955 |
| 2,906,147 | Pelphrey | Sept. 29, 1959 |
| 2,995,964 | Drader | Aug. 15, 1961 |